April 1, 1947.  O. M. BURKHARDT  2,418,110
CLEARANCE REGULATOR
Filed Aug. 22, 1942
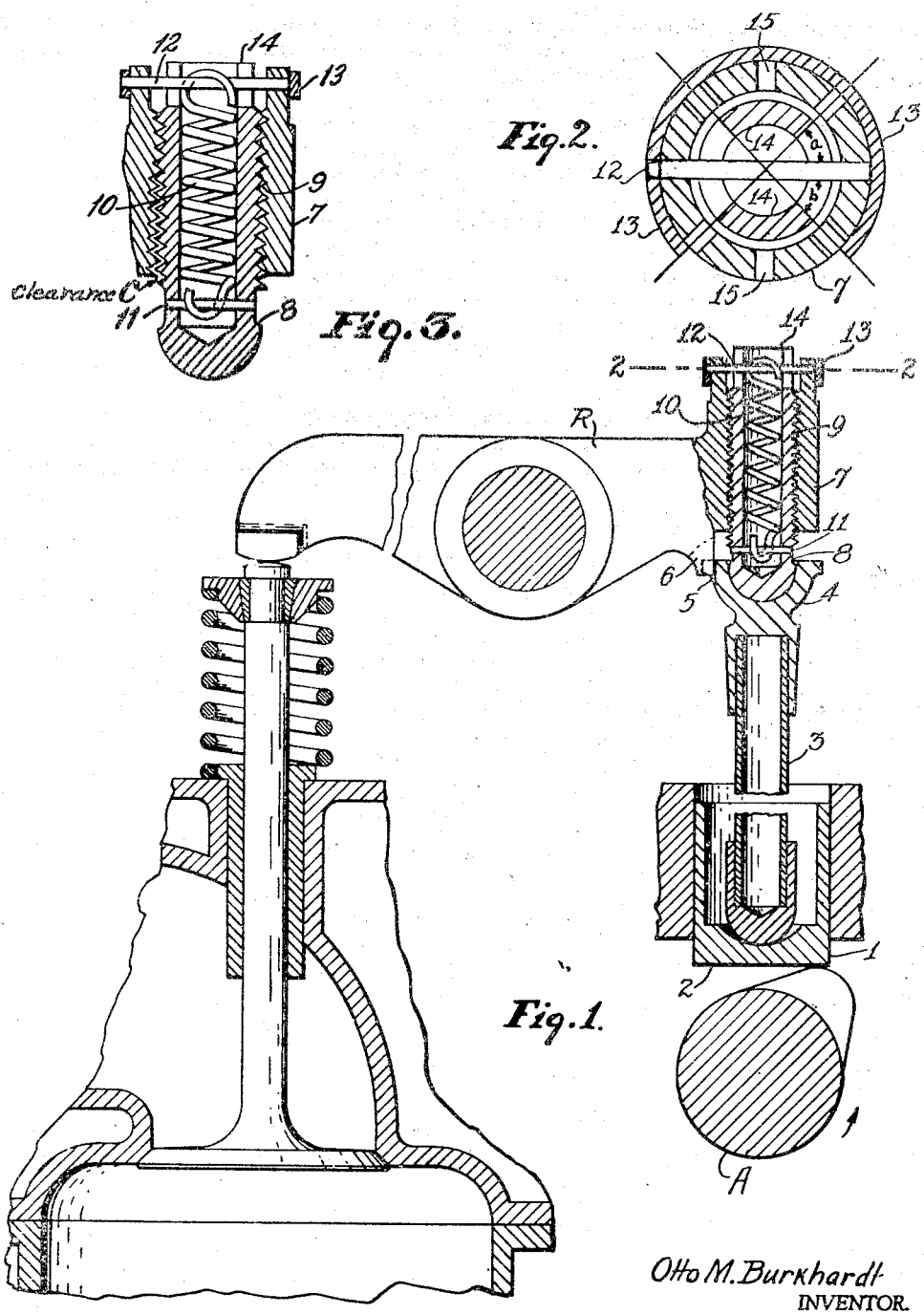
Otto M. Burkhardt
INVENTOR.
BY Milburn & Milburn Patented Apr. 1, 1947

2,418,110

UNITED STATES PATENT OFFICE 2,418,110

CLEARANCE REGULATOR

Otto M. Burkhardt, Cleveland, Ohio

Application August 22, 1942, Serial No. 455,710

11 Claims. (Cl. 123—90)

This invention relates to a clearance regulator that will automatically adjust the clearance within the valve linkage of an internal combustion engine.

If, in internal combustion engines of conventional design, the valve linkage contracts or expands, then the clearance normally provided in such linkage changes accordingly. If because of expansion of the linkage, all clearance is taken up, then there is great danger that the valve will be held open and in some cases this actually happens. If the linkage contracts, then the clearance often becomes excessive and the operation of the valve linkage becomes noisy. Too large or too small a clearance causes considerable variation in the opening and closing of the valves, and this condition is aggravated when the cam contours are provided with ramps in order to secure quiet operation and in extreme cases to protect the valve mechanism from heavy impacts. These undesirable conditions are entirely overcome by my automatically adjustable clearance regulator.

As a member of the valve linkage, this device will automatically take up slackness, due to wear and contraction of the valve linkage, by effecting a corresponding increase in its length; and it will also positively function in the opposite manner so that when the valves become hot and the entire valve linkage expands, the structural length of the clearance regulator will, during a suitable period of each cam shaft revolution, decrease a micrometric amount. The particular features of my present form of device help to make it most practical and efficient, as will be more fully explained.

As above stated, my new clearance regulator constitutes part of the valve linkage. It is so constructed and arranged that its axial length is decreased a micrometric amount for each cam shaft revolution and this decrease is so controlled that at all times it is equal to or greater than the expansion of the rest of the linkage that may occur during one revolution of the cam shaft. The decrease in axial length is preferably greater than the expansion of the linkage so as to ensure firm closing of the valves and also because it is desirable that for each revolution the clearance regulator will have to take up a little slackness. This precaution not only ensures proper seating of the valve but precludes sticking of the adjusting means that might otherwise occur after being in one position for a comparatively long time. The decrease in axial length of the clearance regulator must be of a controlled micrometric amount as otherwise the valve mechanism would become noisy and thus have one of the same defects that the clearance regulator is intended to overcome.

In general, the present invention has for its object the regulation of clearance within the valve linkage through inclined surface engagement between the co-operating companion members of the regulator device, there being provided means whereby one of these members is urged automatically to turn relatively to the other member to take up clearance within the valve linkage.

It is also an object to provide an automatic clearance regulator that can be readily installed either as standard equipment or in other new motors or in motors already in use.

Another object is to provide such a clearance regulator with means for controlling the rotary movement of that companion member which is capable of rotation and for limiting the extent of such rotative movement in either direction.

Another object is to provide such a regulator with means for facilitating the initial setting or adjusting of the one companion member within the other.

Another object is to devise such a regulator in which there is utilized the lateral tilting movement of the one end of a rocker arm or some other oscillating member of the valve linkage as a means of ensuring the relative tilting movement between the companion members of the regulator and thereby ensuring the relative longitudinal adjustment between such members.

Other objects will appear from the following description and claims when considered together with the accompanying drawing.

Fig. 1 is a sectional view illustrating my improved device in assembly; and

Fig. 2 is a sectional view taken on line 2—2 of Fig. 1, this view being enlarged; and Fig. 3 illustrates the lateral clearance between the screw-threaded members.

It is to be understood that the present form of disclosure is merely for the purpose of illustration and that there might be devised various modifications thereof without departing from the spirit of the invention as herein set forth and claimed.

My present form of device is adapted to be arranged between a cam shaft A and some suitable member of the valve linkage. The cam shaft is the driving member and all parts of the linkage, including the valve, may be considered as driven members. However, the relative arrangement of the driving and driven members is reversed during the first part of the valve-closing period when the valve spring's action upon the valve is the temporary driving force.

Referring to the accompanying drawing, the member 1 has its mushroom end 2 in contact with the cam lobe of the cam shaft A. Within the member 1 there is provided a push rod 3, the upper end of which is provided with a spherical socket 4. On the periphery of this socket there is a groove 5 so arranged that its sides straddle a tongue 6 provided upon the rocker arm boss 7. This arrangement might be reversed so that two prongs on the rocker arm-portion 7 straddle a tongue projecting from the periphery of the socket 4. Either arrangement will keep the push rod 3 from turning. It is desirable that member 1 turn about its axis but it is not desirable that any uncontrollable tendency to turn be transferred to the valve clearance adjusting members. This tongue and groove arrangement in no way hinders the push rod in the performance of its main function, namely that of opening the valve, but it protects the clearance regulator members from any relative turning effect other than that which is intended to be effected and utilized for the regulation of clearance.

Referring now to the valve clearance adjusting device in detail, the lower end of the main member 8 fits into the spherical socket 4 of the push rod and has screw-threaded engagement with its companion member here shown as a boss 7 upon the one end of rocker arm R, the threaded engagement between the companion members 7 and 8 being indicated by reference numeral 9.

The member 8 has at the lower portion thereof a total lateral clearance C or a clearance $$\frac{C}{2}$$

on each side when there is no horizontal force urging member 8 towards one side within its companion member 7. This lateral clearance may be provided between the threaded portions of the members, or the threads may be omitted at the lower end portions of the companion members and the lateral clearance provided between plain cylindrical portions of these members, in a manner somewhat similar to that shown in my prior Patent No. 2,222,138. At the upper portion, the member 8 is held normally concentric within the threaded end 7 of the rocker arm R by the interengagement between the inclined helical surfaces. The buttress type of thread, which is also shown in said prior patent of mine, is preferred although any other form of thread may well serve the purpose. The buttress type of thread has the characteristic of holding the one member concentric within its companion member; and, at the same time, the bevel of the threads can be so chosen that it produces any desirable pressure between the contact surfaces. This pressure helps to stop the vibrations quickly and increases the friction between the threads. Also, there being no bevel or very little bevel on the back side of the threads, they very easily free themselves and this facilitates the screwing apart of the members by the spring means 10 if excess clearance is present in the linkage.

The spring means 10 is provided within member 8, the lower end of the spring being hooked about a transverse bar 11 which is anchored in member 8, while the upper end of spring 10 is anchored upon a transverse pin 12 fixed in the upper end of the boss end portion 7 of the rocker arm R. The torque of spring 10 tends to screw member 8 downwardly within the rocker arm boss 7 and consequently takes out any clearance in the valve linkage. In addition to the torque, the spring 10 may exert some axial tension or pressure if it should be desired to have some pressure either upon one side or the other of the threaded surfaces.

Pin 12 is held in position by a snap ring 13, the chamfered end of the pin fitting into a hole in the snap ring. This hole permits the conical end of the pin 12 to enter but not to pass therethrough. Thus the snap ring 13 holds the pin 12 in position and, at the same time, pin 12 prevents the snap ring from working itself away from the proper locking position.

The upper end of member 8 is forked, as shown in the drawing. In a properly adjusted position, the arcuate prongs 14 of the forked end are so located that member 8 may be turned clockwise an angle $a$ and counterclockwise an angle $b$. Upon turning these intentionally limited amounts, the prongs may contact with pin 12 and prevent any further turning of member 8. A number of holes 15 may be provided in the circumference of the rocker arm boss 7 so that, through selection of suitable holes 15 for anchorage of pin 12, a convenient and quick manual adjustment for member 8 can be obtained. At the same time, the angles $a$ and $b$ ensure sufficient freedom for automatic adjustment so as to permit the desired automatic clearance regulation. This limitation of the automatic adjustment to convenient and practical amounts affords all the advantages, especially that of safety, that are characteristic of the conventional locked adjustment. Should a valve spring or a valve break, then the automatic adjustment will follow only to a very limited extent, whereupon the device will act substantially like one having conventional locked adjustment. Or should, for some reason, member 8 stick within the rocker arm boss 7 or should the spring means 10 break, then only very little clearance can develop in the valve linkage. The total amount of such clearance as may develop upon any such occasion, due to accident, will probably never be more than the clearance that frequently exist within normally adjusted valve linkages.

During the valve-opening period, the members of the clearance regulator will screw together a controlled micrometric amount, and the geometry of this adjustment is the same as is explained in connection with the corresponding action of the device shown in my Patent No. 2,222,138, November 19, 1940, attention being called to Figs. 2 and 3 thereof and the explanatory matter pertaining thereto.

The cam shaft A turns in the direction of the arrow, counterclockwise, and exerts upon the push rod a substantially vertical pressure; and the valve linkage resists, through the rocker arm or other oscillating member on the push rod side, with a force which at the extreme positions of oscillation has a considerable horizontal component. This horizontal component tends to push the member 8 towards the right within its threaded boss 7, as viewed in Fig. 1, until the lateral clearance $$\frac{C}{2}$$

has been overcome. When the valve is open, the horizontal component acts in the opposite manner and urges member 8 to reverse like a pendulum until the entire lateral clearance C, which now occurs on the opposite side, is traversed. This pendulum-like motion of member 8 overcomes the static friction between the threaded surfaces and the contact surfaces slide a very small amount down the incline provided by the helix of the threaded surfaces 9. During both the opening and closing operations, the relative lateral movement between the companion threaded members is further induced by the arcuate movement of the rocker arm in the end portion of which the threaded member 7 is embodied.

When the valve has seated, the upward and downward pressures disappear and the over-all length of the clearance regulator is less than it was before the valve-lift. If, during the valve-lift, the linkage has expanded a small amount, then the new and shorter structural length of the clearance regulator should still momentarily occasion a minute clearance within the valve linkage. During the interval which elapses before the next valve-lift, the torque of the spring means forces the member 8 in the direction outwardly of the rocker arm boss 7 and into distended position until all clearance within the linkage is taken up.

The helix angle of the contact surfaces on the threads 9 is so chosen that when the upward and downward pressures are acting concentrically and when there are no impact forces, no relative action can take place between member 8 and the rocker arm boss 7. The contact surfaces between the member 8 and the rocker arm boss 7 are commonly known as self-locking.

The most important consideration in any such device is the danger of open valves. Therefore, it is necessary that during each valve-operating period there be produced a sufficient amount of relative motion between the companion members 7 and 8 so that at the moment the valve returns to its seat, there is always a suitable amount of clearance in the linkage to ensure proper seating of the valve and this is then taken up by spring 10 threading the member 8 downwardly.

If, for some reason, the valve has been lifted off of its seat some distance in excess of the small amount by which the clearance regulator shortens during each valve lift, then a larger number of valve-lift periods may be required before the valve comes to its seat again; but, unless the valve sticks tight in its guide, it will always come back to its seat because the large number of small amounts, by which the regulator shortens for each cam shaft revolution, will soon amount to as much as the valve has held open.

From the above, it will be seen that this clearance regulator is double-acting, in that it provides a certain predetermined amount of slackness during the operation of the valve, thereby compensating for expansion in the valve linkage; and, upon closing of the valve, it ensures the taking up of slackness due to wear and contraction.

Thus I have produced a practical device in which there will be automatically afforded the proper relative motion between the members 7 and 8, and these members will be releasably held in the position to which thus adjusted. This device will ensure constant timing in the valve operation; it will ensure firm closing of the valve upon its seat; and it will operate in a quiet, positive and dependable manner. Moreover, my device is capable of such automatic, effective and dependable adjustment under any conditions at any time, such functioning being quite essential for practical operation.

Incidental to the formation of the one end of the rocker arm or some other oscillating member of the valve linkage to serve as one of the companion members of the regulator device, the relative adjustment between such members is facilitated by the rocking movement of such a member, such movement being utilized in effecting the relative lateral cocking or tilting movement by which the adjustment between the threaded surfaces is effected, as more fully explained in my previous patent above noted.

Furthermore, I have provided convenient and quick means for manually setting member 8 and I have provided means to limit the extent of relative movement between the companion members, as above explained. Also, this device includes means to prevent uncontrollable relative adjustment between the companion members 7 and 8, as might otherwise be caused by the action of the horizontal component above referred to.

Finally, this form of device is of comparatively simple construction and hence can be manufactured at comparatively low cost.

What I claim is:

1. In an internal combustion engine having a valve-operating linkage in which a driven element is operated through eccentric forces received from a driving element, an automatically adjustable clearance regulator assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce relative axial adjustment therebetween, one of said members being capable of lateral motion relatively to the other of said members, resilient means normally tending to adjust the companion members so as to lengthen the regulator, and means for preventing transmission of rotary motion from said driving element to said companion members.

2. In an internal combustion engine having a valve-operating linkage in which a driven element is operated through eccentric forces received from a driving element, an automatically adjustable clearance regulator assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce relative axial adjustment therebetween, resilient means normally tending to adjust the companion members so as to lengthen the regulator, and readily accessible and adjustable stop means to limit relative adjustment between said members in either direction so as to limit the extent of shortening and lengthening of said regulator.

3. In an internal combustion engine having a valve-operating linkage in which a driven element is operated through eccentric forces received from a driving element, an automatically adjustable clearance regulator assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce relative axial adjustment therebetween, resilient means normally tending to adjust the companion members so as to lengthen the regulator, and readily accessible and adjustable stop means to limit the extent of shortening of said regulator.

4. In an internal combustion engine having a valve-operating linkage in which a driven element is operated through eccentric forces received from a driving element, an automatically adjustable clearance regulator assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce relative axial adjustment therebetween, resilient means normally tending to adjust the companion members so as to lengthen the regulator, and readily accessible and adjustable means for limiting the extent of lengthening of said regulator.

5. In an internal combustion engine having a valve-operating linkage in which a driven element is operated through eccentric forces received from a driving element, an automatically adjustable clearance regulator being assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce said relative axial adjustment therebetween, one of said members being capable of lateral motion relatively to the other of said members, resilient means normally tending to adjust said companion members to lengthen the regulator, said linkage including also an element adapted to transmit such impulse to one of said regulator members, and means for preventing said element from transmitting any rotary movement to said regulator members.

6. In an internal combustion engine having a valve-operating linkage in which a driven element is operated through eccentric forces received from a driving element, an automatically adjustable clearance regulator being assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce said relative axial adjustment therebetween, one of said members being capable of lateral motion relatively to the other of said members, resilient means normally tending to adjust said companion members to lengthen the regulator, said linkage including also an element arranged for actuation longitudinally by said driving element and being adapted to transmit such impulse to one of said regulator members, and means for preventing rotary movement of said element, last-named.

7. In an internal combustion engine having a valve-operating linkage in which a driven element is operated through eccentric forces received from a driving element, an automatically adjustable clearance regulator being assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce said relative axial adjustment therebetween, one of said members being capable of lateral motion relatively to the other of said members, resilient means normally tending to adjust said companion members to lengthen the regulator, said linkage including also a socket member adapted for reciprocating movement by said driving element, an element freely mounted within said socket and being adapted to transmit the impulse of said driving element to one of said regulator members, and means for preventing rotation of said last-named element.

8. In an internal combustion engine having a valve-operating linkage in which a driven element is operated through eccentric forces received from a driving element, an automatically adjustable clearance regulator being assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce said relative axial adjustment therebetween, one of said members being capable of lateral motion relatively to the other of said members, resilient means normally tending to adjust said companion members to lengthen the regulator, said linkage including also a socket member adapted for reciprocating movement by said driving element, an element freely mounted within said socket and having socket connection at its other end with one of said regulator members so as to transmit the impulse of said driving element thereto, and means for preventing rotation of said last-named element.

9. In an internal combustion engine having a valve-operating linkage in which a driven element is operated through eccentric forces received from a driving element, an automatically adjustable clearance regulator assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce relative axial adjustment therebetween, resilient means normally tending to adjust the companion members so as to lengthen the regulator, one of said members having oppositely disposed notches for limiting the extent of relative movement between said members, the other of said members having a plurality of pairs of oppositely disposed apertures for adjustment and setting of the one of said members with respect to the other of said members, and a single pin adapted to be positioned in a pair of said apertures and extending through said notches for co-operation therewith in limiting the relative movement between said members.

10. In an internal combustion engine having a valve-operating linkage in which a driven element is operated through eccentric forces received from a driving element, an automatically adjustable clearance regulator assembled as part of the valve-operating linkage and including companion members having inclined helical surface engagement with each other for axial relative adjustment and having suitable lateral clearance between them including lateral clearance between them adjacent one end of the regulator so as to permit action of said eccentric forces upon said members and thus induce relative axial adjustment therebetween, one of said members having oppositely disposed notches in one end thereof for limiting the extent of relative movement between said members, the other of said members having a plurality of pairs of oppositely disposed apertures for adjustment and setting of the one member with respect to the other of said members, a single pin adapted to be positioned in a pair of said apertures and extending through said notches for co-operation therewith in limiting the relative movement between said members, and a coil spring normally tending to adjust said members to lengthen the regulator, said spring having its one end anchored to said pin and having its other end anchored to said other companion member.

11. In an internal combustion engine having a valve-operating linkage in which a combination of driving and driven elements induces a motion lateral to the predominant valve linkage motion, an automatically adjustable clearance regulator being assembled as part of the valve-operating linkage and including companion members having inclined helical surface engagement with each other for axial relative adjustment and having suitable lateral clearance between them including lateral clearance between them adjacent one end of the regulator so as to permit the effect of said lateral motion upon said members and thus induce said axial relative adjustment therebetween, resilient means normally tending to adjust said companion members to lengthen the regulator, said linkage including a rocker arm, one of said companion members being embodied as part of one end of said rocker arm so as to partake of the rocking movement thereof and thereby tend to effect the relative axial adjustment between said companion members, said linkage including also an element arranged between said driving element and one of said companion members and being adapted for actuation by said driving element, means provided between said element and said rocker arm for preventing rotary movement of said last-named element, and means provided between said rocker arm and the other of said companion members for limiting such relative adjustment between said companion members.

OTTO M. BURKHARDT.

REFERENCES CITED

The following references are of record in the file of this patent:

UNITED STATES PATENTS

| Number | Name | Date |
|---|---|---|
| 1,905,888 | Berry | Apr. 25, 1933 |
| 1,903,078 | Woolman | Mar. 28, 1933 |
| 1,817,620 | Hamilton | Aug. 4, 1931 |
| 1,790,999 | Perkins | Feb. 3, 1931 |
| 1,995,665 | Brackett | Mar. 26, 1935 |
| 1,445,118 | Ware | Feb. 13, 1923 |
| 1,907,631 | Warren | May 9, 1933 |
| 2,176,895 | Engemann | Oct. 24, 1939 |
| 1,333,160 | Cline | Mar. 9, 1920 |
| 1,499,928 | Hutt | July 1, 1924 |
| 2,322,514 | Goodwin | June 22, 1943 |